United States Patent [19]
Adam et al.

[11] Patent Number: 5,651,748
[45] Date of Patent: *Jul. 29, 1997

[54] TWO-SPEED DIFFERENTIAL

[75] Inventors: Allen D. Adam, Brighton; Barry L. Frost, Waterford; John R. Forsyth, Romeo, all of Mich.

[73] Assignee: New Venture Gear, Inc., Troy, Mich.

[*] Notice: The term of this patent shall not extend beyond the expiration date of Pat. No. 5,503,603.

[21] Appl. No.: 626,127

[22] Filed: Apr. 1, 1996

Related U.S. Application Data

[63] Continuation of Ser. No. 277,501, Jul. 19, 1994, Pat. No. 5,503,603.

[51] Int. Cl.$^6$ .............................. F16H 37/08; F16H 48/10
[52] U.S. Cl. .............................. 475/204; 475/252
[58] Field of Search ........................ 475/204, 149, 475/150, 198, 230, 248, 252

[56] References Cited

U.S. PATENT DOCUMENTS

| | | | |
|---|---|---|---|
| 2,056,303 | 10/1936 | Starr | 475/204 |
| 2,225,720 | 12/1940 | Snow | 475/204 |
| 2,858,714 | 11/1958 | Black | 475/204 |
| 2,882,752 | 4/1959 | Russell | 475/204 |
| 2,933,952 | 4/1960 | Schou | 475/204 |
| 3,195,371 | 7/1965 | Christie | 475/204 |
| 4,031,780 | 6/1977 | Dolan et al. | |
| 4,392,394 | 7/1983 | Hofbauer et al. | 475/204 |
| 4,677,873 | 7/1987 | Eastman et al. | 74/665 GE |
| 4,920,828 | 5/1990 | Kameda et al. | 475/204 |
| 5,006,098 | 4/1991 | Yoshinaka et al. | 475/252 |
| 5,030,182 | 7/1991 | Frost | 475/221 |
| 5,046,998 | 9/1991 | Frost | 475/221 |
| 5,078,660 | 1/1992 | Williams et al. | 475/84 |
| 5,106,351 | 4/1992 | Williams et al. | 475/250 |
| 5,273,498 | 12/1993 | Dillon et al. | 475/230 |
| 5,284,068 | 2/1994 | Frost | 74/665 GA |

FOREIGN PATENT DOCUMENTS

| | | | |
|---|---|---|---|
| 91406 | 10/1983 | European Pat. Off. | 475/204 |
| 4137931 | 5/1992 | Germany | 475/252 |

*Primary Examiner*—Charles A. Marmor
*Assistant Examiner*—Nathan O. Jensen
*Attorney, Agent, or Firm*—Harness, Dickey & Pierce, P.L.C.

[57] ABSTRACT

A two-speed differential adapted for use in motor vehicle driveline applications. The two-speed differential is capable of selectively transferring power to either a first drive mechanism for establishing a first drive speed ratio or a second drive mechanism for establishing a second drive speed ratio. The selected drive mechanism then transmits power to an output mechanism for subsequent transmission to the driving axles of the motor vehicle while permitting speed differentiation therebetween. In one aspect of the present invention, the first drive mechanism provides a "direct drive" speed ratio and the second drive mechanism provides an "overdrive" speed ratio. In another aspect of the present invention, the first drive mechanism provides a "direct drive" speed ratio and the second drive mechanism provides an "underdrive" speed ratio.

12 Claims, 7 Drawing Sheets

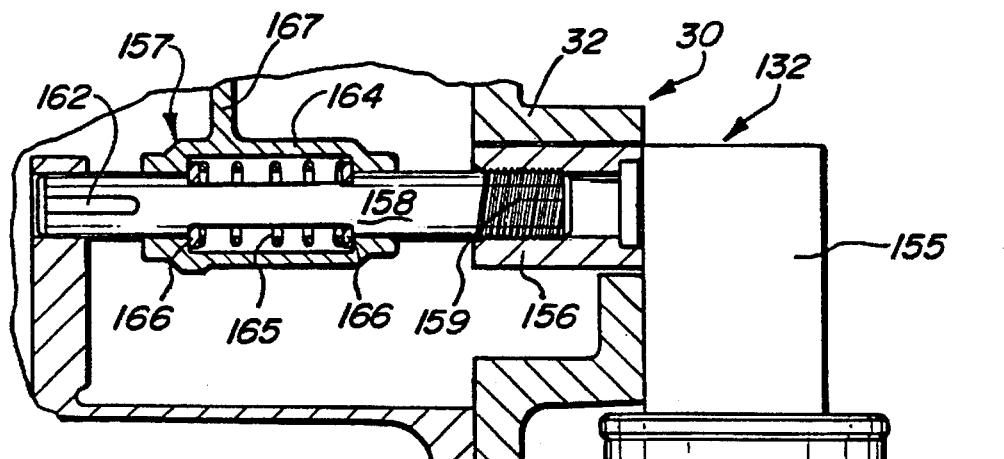
*Fig-3*
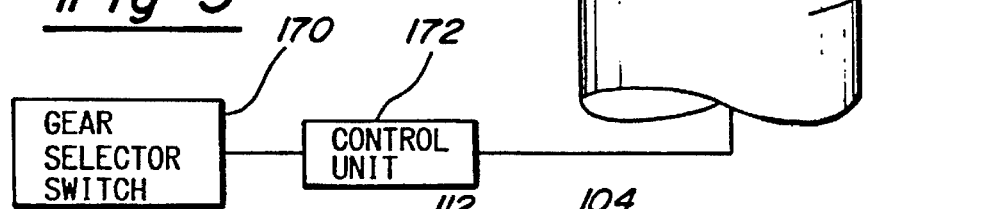
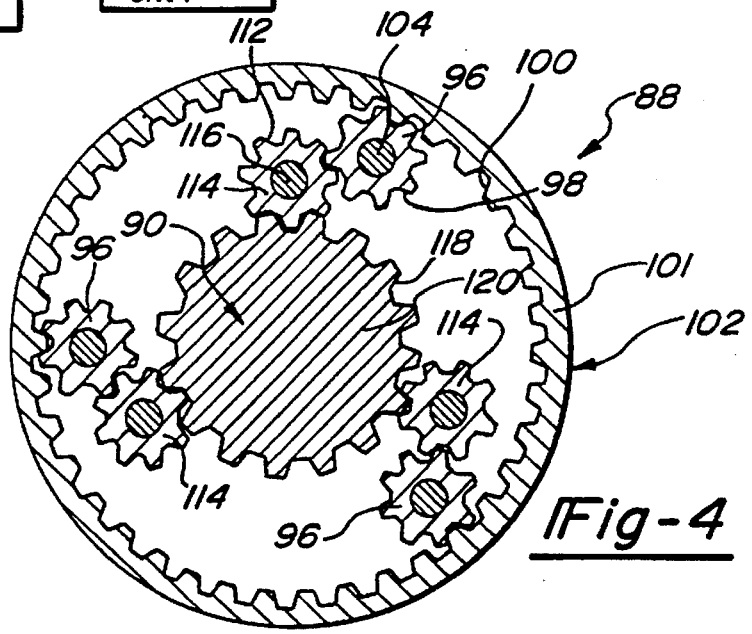
*Fig-4*
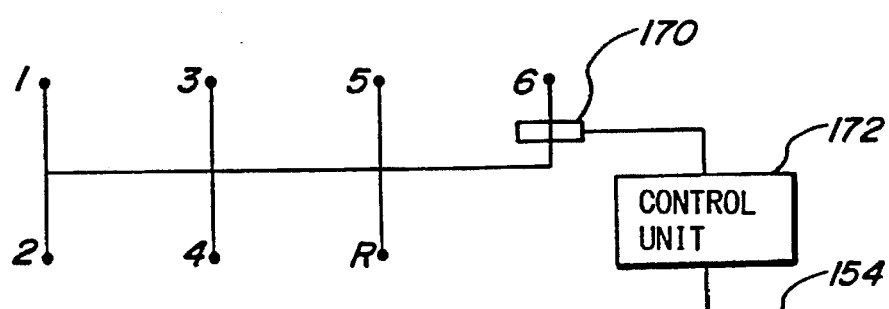
*Fig-5*

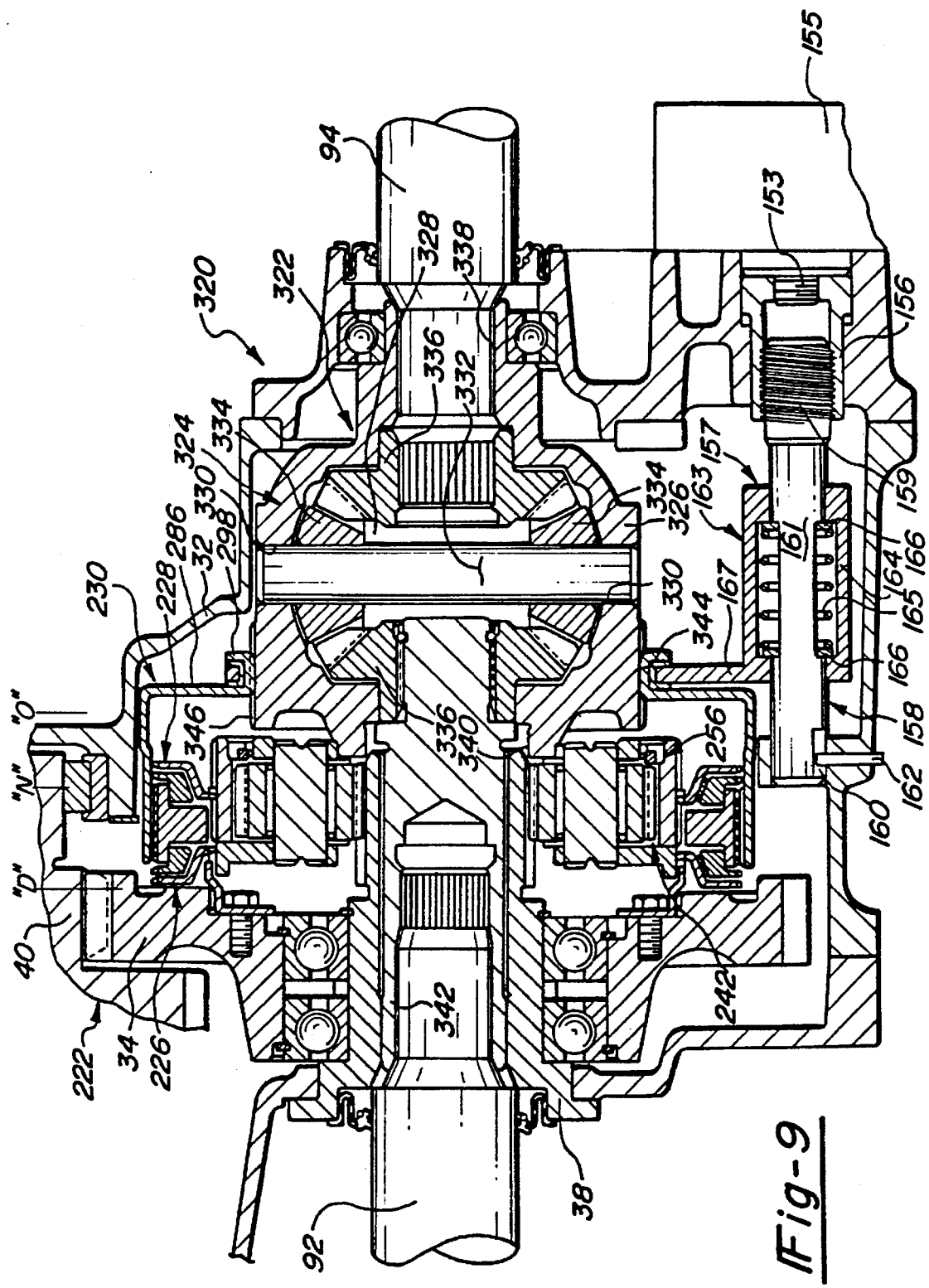

5,651,748

1
TWO-SPEED DIFFERENTIAL

This is a continuation of U.S. patent application Ser. No. 08/227,501, filed Jul. 19, 1994 U.S. Pat. No. 5,503,603.

BACKGROUND OF THE INVENTION

This invention relates generally to differentials and specifically to a two-speed differential for use in motor vehicles.

As is known, differentials are incorporated into the driveline of motor vehicles for permitting relative rotation (i.e., "speed differentiation") between a pair of driven shafts while concomitantly transferring power thereto from the vehicle's powertrain. In transaxle and final drive axle applications, the differential is used as an "intra-axle" device for delivering power and permitting speed differentiation between a pair of axle half-shafts that are connected to a set of wheels. One example of an intra-axle differential is disclosed in commonly owned U.S. Pat. No. 5,273,498 entitled "Differential Mechanism". In full-time four-wheel drive applications, it is known to provide an "inter-axle" differential between the front and rear outputs of a power transfer device for facilitating speed differentiation and power transfer between the front and rear wheel sets. Various inter-axle differential constructions are disclosed in the following commonly owned U.S. Patents: U.S. Pat. No. 4,031,780 entitled "Coupling Apparatus For Full Time Four Wheel Drive"; U.S. Pat. No. 4,677,873 entitled Transfer Case With Inter-Axle Dual-Planetary Differential"; U.S. Pat. No. 5,046,998 entitled "Two-Wheel Drive Mode For Full-Time Transfer Case"; and U.S. Pat. No. 5,078,660 and U.S. Pat. No. 5,106,351 which are both entitled "Transfer Case Limited Slip Planetary Differential". While the aforementioned differentials depict advancements within the art, an improved differential capable of providing two distinct drive ratios would be beneficial.

SUMMARY OF THE INVENTION

In accordance with each of the preferred embodiments of the present invention, a new and useful differential is disclosed which is capable of providing two distinct drive speed ratios. In general, the two-speed differential of the present invention is preferably adapted for use in motor vehicle driveline applications. More particularly, the two-speed differential of the present invention is capable of selectively transferring power to either a first drive mechanism for establishing a "direct drive" speed ratio or a second drive mechanism for establishing a different drive speed ratio. The selected drive mechanism then transmits power to an output mechanism for subsequent transmission to the driving axles of the motor vehicle while permitting speed differentiation therebetween. In one aspect of the present invention, the second drive mechanism provides an "overdrive" speed ratio. In another aspect of the present invention, the second drive mechanism provides an "underdrive" speed ratio.

The two-speed differential of the present invention is advantageous over conventional differentials. For instance, the two-speed differential of the present invention provides an additional speed ratio for use with an existing multi-speed transmission gearbox. Thus, an additional speed ratio can be accommodated even where no physical space remains within the main transmission gearbox. In addition, the additional speed ratio provided by the two-speed differential further results in improved fuel efficiency and powertrain performance. Additional advantages and features of the present invention will become apparent from the following description and appended claims, taken in conjunction with the accompanying drawings.

BRIEF DESCRIPTION OF THE DRAWINGS

FIG. 3 is an enlarged fragmentary elevational view, partially in section, showing components of a speed selecting mechanism associated with the two-speed differential of FIG. 1;

FIG. 4 is an enlarged cross-sectional view taken along line 4—4 of FIG. 1;

FIG. 5 is a schematic diagram showing the shift pattern employed when the two-speed differential of FIG. 1 is installed within an otherwise conventional five-speed transmission gearbox;

FIG. 9 is an elevational view, partially in section, showing yet another alternate preferred embodiment of a two-speed differential that is capable of providing a "underdrive" speed ratio in addition to a "direct drive" speed ratio.

DETAILED DESCRIPTION OF THE PREFERRED EMBODIMENT

Figure 1:
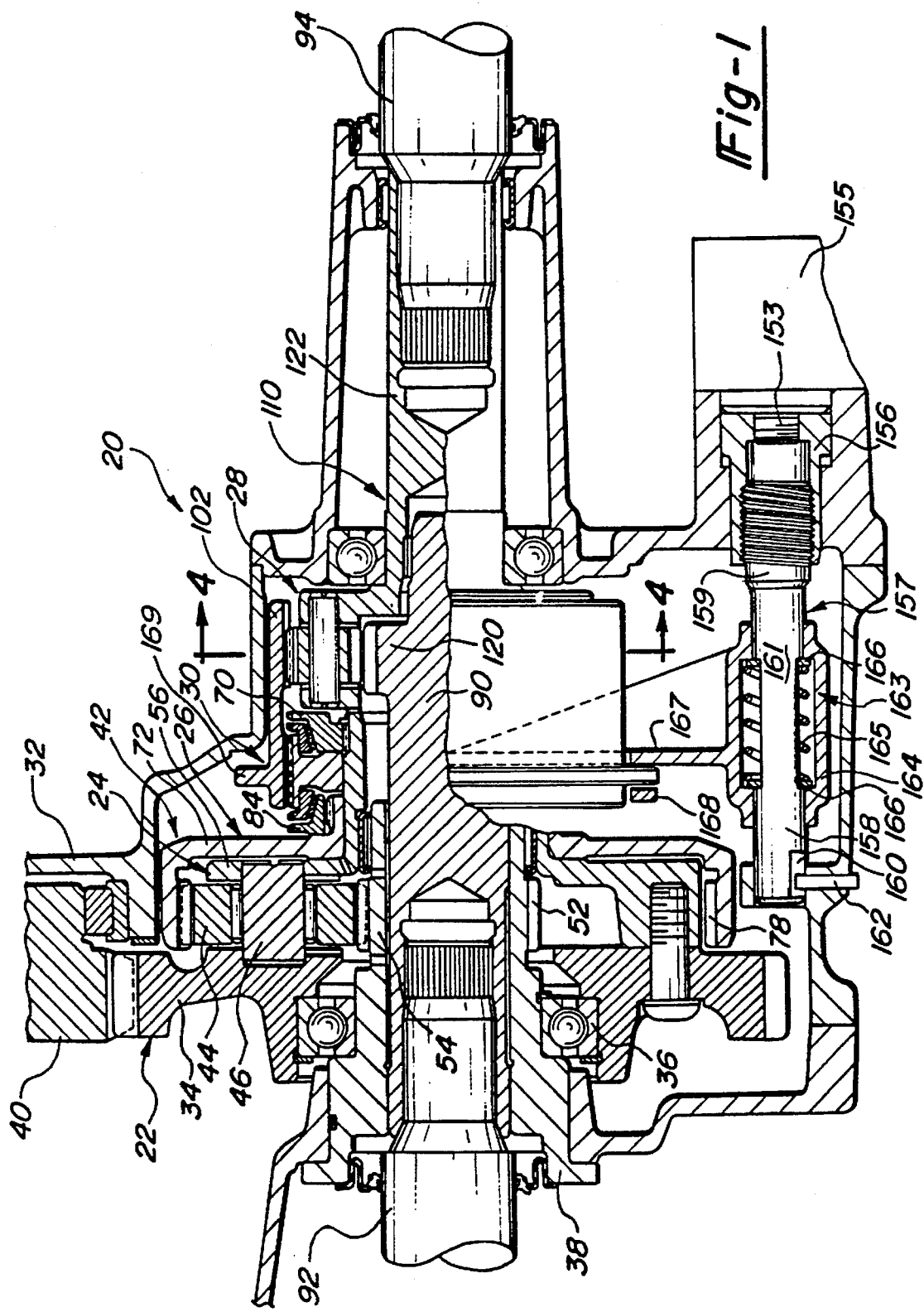
FIG. 1 is an elevational view, partially in section, showing a preferred embodiment of a two-speed differential that is capable of providing a "direct drive" speed ratio and an "overdrive" speed ratio.
Figure 2:
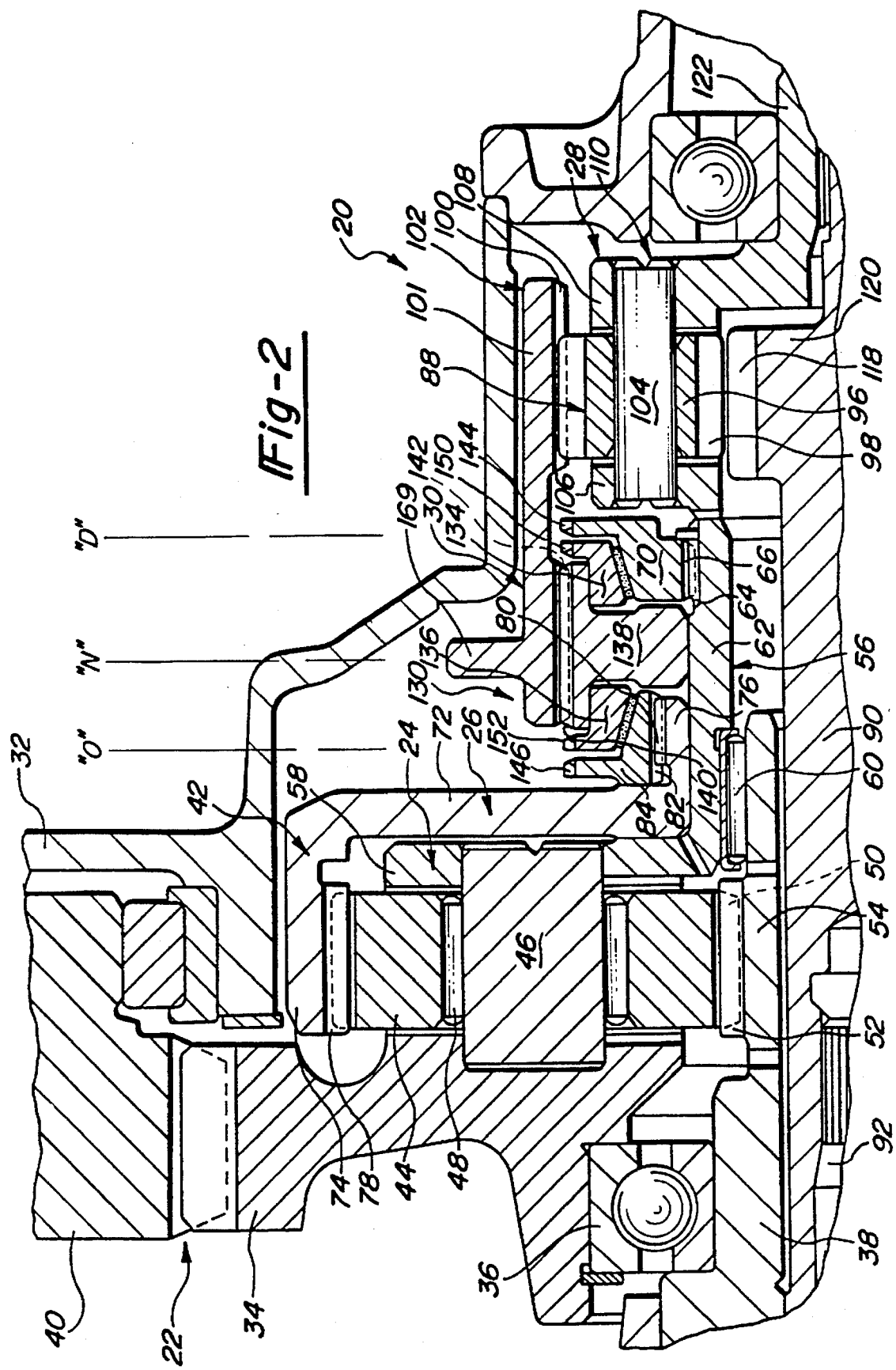
FIG. 2 is an enlarged fragmentary sectional view of the two-speed differential shown in FIG. 1.

With particular reference to FIGS. 1 and 2, a preferred embodiment of a two-speed differential 20 of the present invention is shown in association with a portion of an automotive powertrain for delivering power (i.e., drive torque) to a pair of shafts while still permitting speed differentiation therebetween. In its most basic form, two-speed differential 20 includes an input mechanism 22 for receiving the power from the motor vehicle's powertrain, a first drive mechanism 24 for establishing a first drive speed ratio, a second drive mechanism 26 for establishing a second drive speed ratio, an output mechanism 28 for delivering the drive torque to the shafts while permitting speed differentiation therebetween, and a speed selecting mechanism 30 for coupling output mechanism 28 to one of first drive mechanism 24 and second drive mechanism 26. Preferably, mechanisms 22 through 30 are contained substantially within a housing 32 which is integral with, or interconnected to, the main housing of a power transfer apparatus so as to form a common oil sump therewith. The power transfer apparatus can be any device capable of supplying power from an input to a pair of outputs while permitting differentiation between the outputs. More preferably, two-speed differential 20 is associated with a multi-speed transmission gearbox as part of a front-wheel drive transaxle assembly for delivering power and permitting speed differentiation between a pair of axle half-shafts each connected to one of the vehicle's front wheels.

Input mechanism 22 is shown to include a drive gear 34 that is supported via bearing assembly 36 for rotation relative to a stationary stator 38. Drive gear 34 is rotatably driven by an output member 40 (i.e., an output gear) of the multi-speed transmission gearbox. In general, first drive mechanism 24 is associated with a first rotary output of a first planetary gearset 42 while second drive mechanism 26 is associated with a second rotary output thereof. More particularly, planetary gearset 42 includes three pinion gears 44 each journalled on a pinion shaft 46 with a suitable roller bearing assembly 48 positioned therebetween. According to the embodiment disclosed, each pinion gear 44 has twenty-one teeth, identified by reference numeral 50, formed on its outer peripheral surface. Teeth 50 of pinion gears 44 are enmeshed with teeth 52 of an eighteen tooth sun gear 54 formed on stationary stator 38. The first rotary output of planetary gearset 42 includes a carrier 56 that is fixed to drive gear 34 for rotation therewith via a plurality of bolts such that pinion shafts 46 are supported between a radial plate segment 58 of carrier 56 and drive gear 34. To support carrier 56 for rotation relative to stator 38, a roller bearing assembly 60 is juxtaposed between a distal end portion of stationary stator 38 and an axial tubular segment 62 of carrier 56. A plurality of external splines 64 are formed at the distal end of carrier tubular segment 62 which are meshed with internal splines 66 formed on a first clutch member 70. Thus, first clutch member 70 is rotatably driven by carrier 56 and, in turn, drive gear 34 for establishing a one-to-one or "direct drive" speed ratio between input mechanism 22 and first drive mechanism 24.

As noted, second drive mechanism 26 is associated with a second rotary output of planetary gearset 42 which includes a bell-shaped ring gear 72 having a large diameter annular segment 74 and a relatively smaller diameter annular segment 76. Large annular segment 74 has sixty teeth, identified by reference numeral 78, formed on its inner peripheral surface which are enmeshed with teeth 50 of pinion gears 44. As seen, smaller annular segment 76 concentrically surrounds and is journally supported on an outer peripheral surface of tubular carrier segment 62 for rotation relative to carrier 56. External splines 80 are formed on smaller annular segment 76 of ring gear 72 which mesh with internal splines 82 formed on a second clutch member 84. Thus, driven rotation of pinion gears 44 about stationary sun gear 54 causes concurrent rotation of ring gear 72. However, ring gear 72 rotates faster than carrier 56 relative to stator 38 for establishing an "overdrive" speed ratio of 0.769 between input mechanism 22 and second drive mechanism 26.

With particular attention now to FIGS. 1, 2 and 4, output mechanism 28 is shown to include a second planetary gearset 88, an intermediate shaft 90, a left axle shaft 92 interconnected to a left front wheel (not shown) of the motor vehicle, and a right axle shaft 94 interconnected to a right front wheel (not shown) of the motor vehicle. As such, second planetary gearset 88 is an intra-axle device which includes three outer planet gears 96 having external gear teeth 98 enmeshed with internal gear teeth 100 formed on an annular ring gear segment 101 of an elongated shift sleeve 102. Outer planet gears 96 are each journalled for rotation on an outer pinion shaft 104 which is mounted between an inner carrier member 106 and an outer carrier member 108 of a carrier assembly 110. Teeth 98 of outer planet gears 96 are also meshed with external gear teeth 112 formed on three inner planet gears 114 which, in turn, are each journalled for rotation on an inner pinion shaft 116 also mounted to carrier assembly 110. In addition, teeth 112 of inner planet gears 114 are also meshed with teeth 118 of a sun gear 120 formed on intermediate shaft 90. As best seen from FIG. 1, one end of left axle shaft 92 is coupled (i.e., splined) for rotation with intermediate shaft 90 while one end of right axle shaft 94 is coupled (i.e., splined) for rotation with a tubular segment 122 of outer carrier member 108. Thus, right axle shaft 94 and left axle shaft 92 are capable of rotating at different speeds relative to one another for accommodating speed differentiation between the front wheels. In a preferred form, second planetary gearset 88 is constructed to provide a 50/50 torque split between axle shafts 92 and 94. As will be described, speed selecting mechanism 30 is operable for selectively transmitting the drive torque delivered to shift sleeve 102 from either of first drive mechanism 24 and second drive mechanism 26 through second planetary gearset 88 to axle shafts 92 and 94.

As best seen from FIGS. 1, 2 and 3, speed selecting mechanism 30 includes a bi-directional cone-type synchronizer 130 and an actuator 132 for causing selective axial movement of shift sleeve 102 relative to first and second clutch members 70 and 84, respectively. In particular, synchronizer 130 includes a pair of blocker rings 134 and 136 each having a conical friction surface that respectively surrounds a corresponding conical surface on first clutch member 70 and second clutch member 84. Synchronizer 130 also includes a clutch hub 138 journally supported on the outer periphery of tubular carrier segment 62 and which has external splines 140 formed on its outer peripheral surface that are in meshed engagement with a set of clutch teeth 142 formed on the inner peripheral surface of shift sleeve 102. As such, shift sleeve 102 is axially slidable for selectively engaging its clutch teeth 142 with either of clutch teeth 144 formed on first clutch member 70 or clutch teeth 146 formed on second clutch member 84. More particularly, shift sleeve 102 is movable to either a direct drive position ("D") coupling output mechanism 28 to first drive mechanism 24, a neutral position ("N") wherein output mechanism 28 is not coupled to either of first drive mechanism 24 or second drive mechanism 26, or an overdrive position ("O") coupling output mechanism 28 to second drive mechanism 26. The neutral position is basically provided to ensure that shift sleeve 102 is only coupled to one of first drive mechanism 24 or second drive mechanism 26 at any given time. Accordingly, shift sleeve 102 transmits either the speed ratio established by first drive mechanism 24 or second mechanism 26 to output mechanism 28. It will be noted that during axial movement of shift sleeve 102, internal gear teeth 100 of ring gear segment 101 maintain meshed engagement with teeth 98 of outer planet gears 96. As will be detailed, shift sleeve 102 is located in the direct drive position when the 1st through 5th Forward and Reverse drive ratios of the otherwise conventional 5-speed multi-speed transmission gearbox are selected, but is automatically shifted into the overdrive position when a 6th Forward drive ratio is selected.

While not shown, a plurality of suitable thrust mechanisms (i.e., struts and springs) are associated with synchronizer 130 to cause energization thereof in response to axial movement of shift sleeve 102 toward either of clutch members 70 and 84. As is known, blocker rings 134 and 136 are coupled for rotation with clutch hub 138 and can be rotatably indexed or "clocked" relative thereto to inhibit continued axial movement of shift sleeve 102 until speed synchronization is completed. More particularly, blocker ring 134 is operable to inhibit passage of shift sleeve clutch teeth 142 through blocker ring teeth 150, thereby inhibiting the subsequent engagement of shift sleeve clutch teeth 142 with clutch teeth 144 on first clutch member 70, until speed synchronization is established between first clutch member 70 and shift sleeve 102. In a similar manner, blocker ring 136 is operable to require completion of speed synchronization between shift sleeve 102 and second clutch member 84 prior to permitting passage of shift sleeve clutch teeth 142 through blocker ring teeth 152 and into subsequent teeth 146 on sect with clutch teeth 146 on second clutch member 84. Since the particular construction of bi-directional synchronizer 130 is not critical to the novelty of two-speed differential 20, any suitable synchronizer may be used. However, synchronizer 130 is preferably constructed in a manner generally similar to one of the synchronizers disclosed within the following commonly owned U.S. Pat.: U.S. Pat. No. 5,135,087 entitled "Dual-Cone Synchronizer with Servo Action"; U.S. Pat. No. 5,105,927 entitled "Single Cone Servo Action Synchronizer"; U.S. 5,085,303 entitled "Drag-Free Strut-Type Synchronizer"; U.S. Pat. No. 4,901,835 entitled "Transmission Synchronizer with Shift Inhibitor"; and, U.S. Pat. No. 4,732,247 entitled "Triple Cone Synchronizer with Servo Action"; all issued to Frost, one of the inventors of the present invention, and which are all hereby incorporated by reference herewithin.

As noted, speed selecting mechanism 30 includes an actuator 132 for selectively causing movement of shift sleeve 102 between its various predefined positions. Preferably, actuator 132 includes a fractional horsepower dc electric motor 154 and gear reduction unit 155 that are mounted to housing 32 for controllably rotating a threaded actuator sleeve 156 in response to an electric control signal. Actuator sleeve 156 is coupled to a rotary output 153 of gear reduction unit 155. Such rotation of actuator sleeve 156 causes axial movement of a spring-biased shift fork assembly 157 that is coupled to shift sleeve 102. More specifically, shift fork assembly 157 includes a shaft 158 having a threaded portion 159 formed on a first end, a slotted portion 160 formed on its second end, and an intermediate portion 161 having a reduced cross-section. As seen, threaded portion 159 of shaft 158 is threadably coupled to threaded actuator sleeve 156. Furthermore, a pin 162 projects through housing 32 and is nested within slotted portion 160 to inhibit rotation of shaft 158 but still permit longitudinal movement thereof. Shift fork assembly 157 also includes a shift fork 163 having a tubular portion 164 journally supported on shaft 158 and which is centrally recessed to define a biasing chamber with intermediate portion 161 of shaft 158. A compression spring 165 is coaxially mounted to surround intermediate portion 161 of shaft 158 within the spring chamber with its opposite ends abutting washers 166 that are seated against the radial shoulders formed therein. Shift fork 163 also includes an integral fork segment 167 extending from tubular portion 163 and which includes at least two grooved flange segments 168 (one shown in FIG. 1) which encapsulate a portion of a radial flange 169 formed on the outer circumference of shift sleeve 102.

In operation, rotation of actuator sleeve 156 results in longitudinal movement of shaft 158 and, due to the biasing of compression spring 165, concurrent longitudinal movement of shift fork 163. The primary purpose of compression spring 165 is to apply a biasing load on shift fork 163 in response to longitudinal movement of shaft 158 for urging shift fork 163 toward completion of the synchronization process. As will be appreciated, rotation of actuator sleeve 156 in a first direction from the neutral position shown causes concurrent movement of shift fork 163 and shift sleeve 102 toward the direct drive position, while rotation of actuator sleeve 156 in the opposite direction causes concurrent movement of shift fork 163 and shift sleeve 102 toward the overdrive position. While a specific construction for actuator 132 is disclosed, it will be appreciated that any suitable electro-mechanical or hydro-mechanical shift system is within the anticipated scope of the present invention.

An exemplary embodiment wherein two-speed differential 20 is used in an otherwise conventional 5-speed manual transaxle in place of a traditional single-speed differential will now be described. FIG. 5 illustrates a modified shift pattern for a manually-operated gear shift lever which permits the vehicle operator to select a 6th Forward drive ratio that is made available by use of two-speed differential 20. Under normal operation of the vehicle in the 1st through 5th Forward drive ratios and the Reverse drive ratio, a gear selector switch 170, diagrammatically shown in FIGS. 3 and 5, provides an input signal indicative thereof to an electronic control unit 172 which, in turn, controls actuation of motor 154 for maintaining shift sleeve 102 in its direct drive position. Thus, the "direct drive" speed ratio is maintained between drive gear 34 and the driven input (i.e., ring gear segment 101) of output mechanism 28. However, when gear selector switch 170 signals selection of the 6th Forward drive ratio, electronic control unit 172 sends an electric control signal to motor 154 for rotating actuator sleeve 156 in a direction causing axial movement of shift fork assembly 157 and shift sleeve 102 from the direct drive position to the overdrive position, whereby drive torque at the "overdrive" speed ratio is delivered to output mechanism 28. Conversely, upon shifting out of the 6th Forward gear, gear selector switch 170 signals control unit 172 to actuate motor 154 for rotating actuating sleeve 156 in the opposite direction to move shift fork assembly 157 and shift sleeve 102 from the overdrive position to the direct drive position, thereby re-establishing the direct drive power path through two-speed differential 20.

Figure 6:
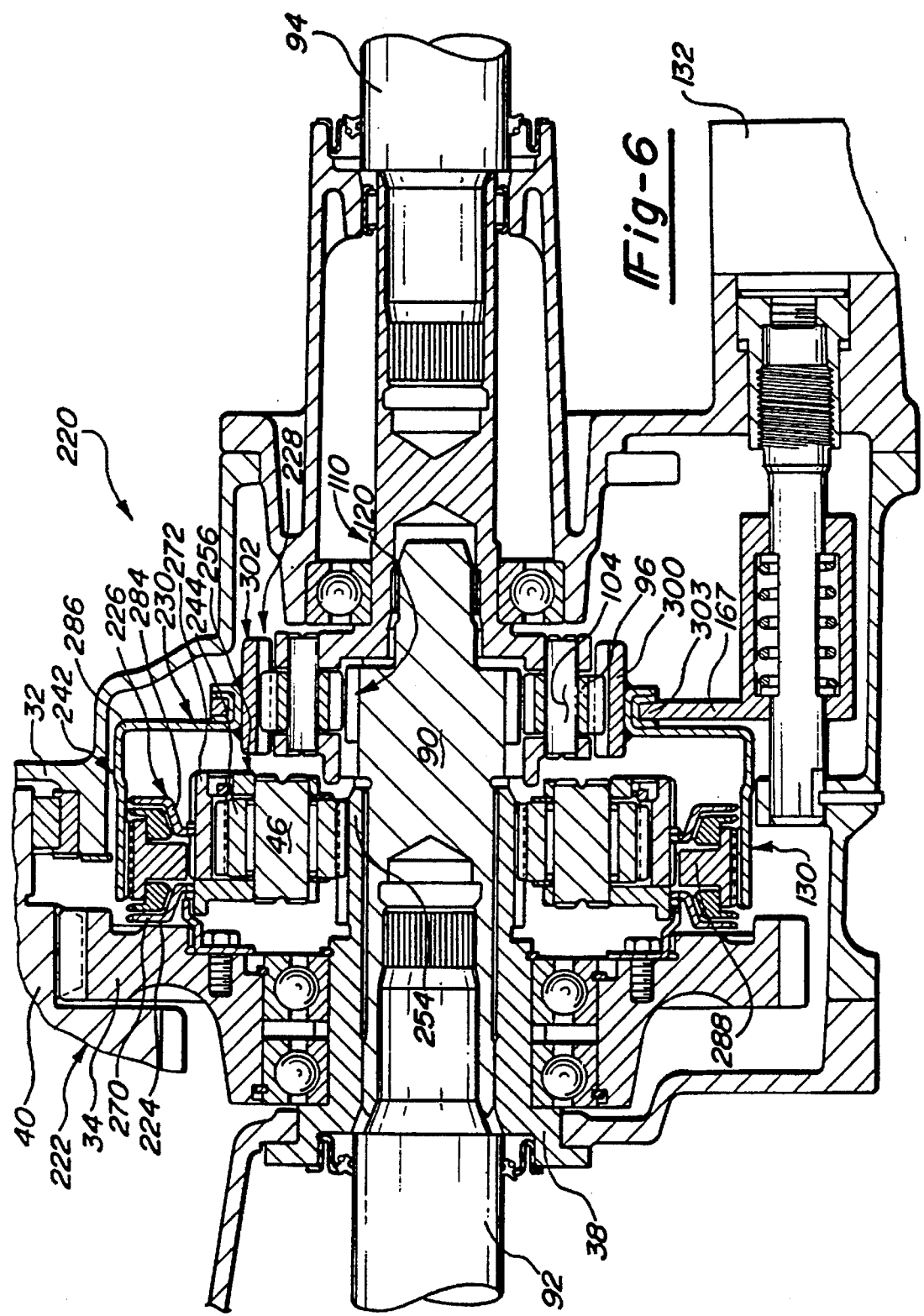
FIG. 6 is an elevational view, partially in section, of an alternate preferred embodiment of a two-speed differential capable of providing an "overdrive" speed ratio in addition to a "direct drive" speed ratio.
Figure 7:
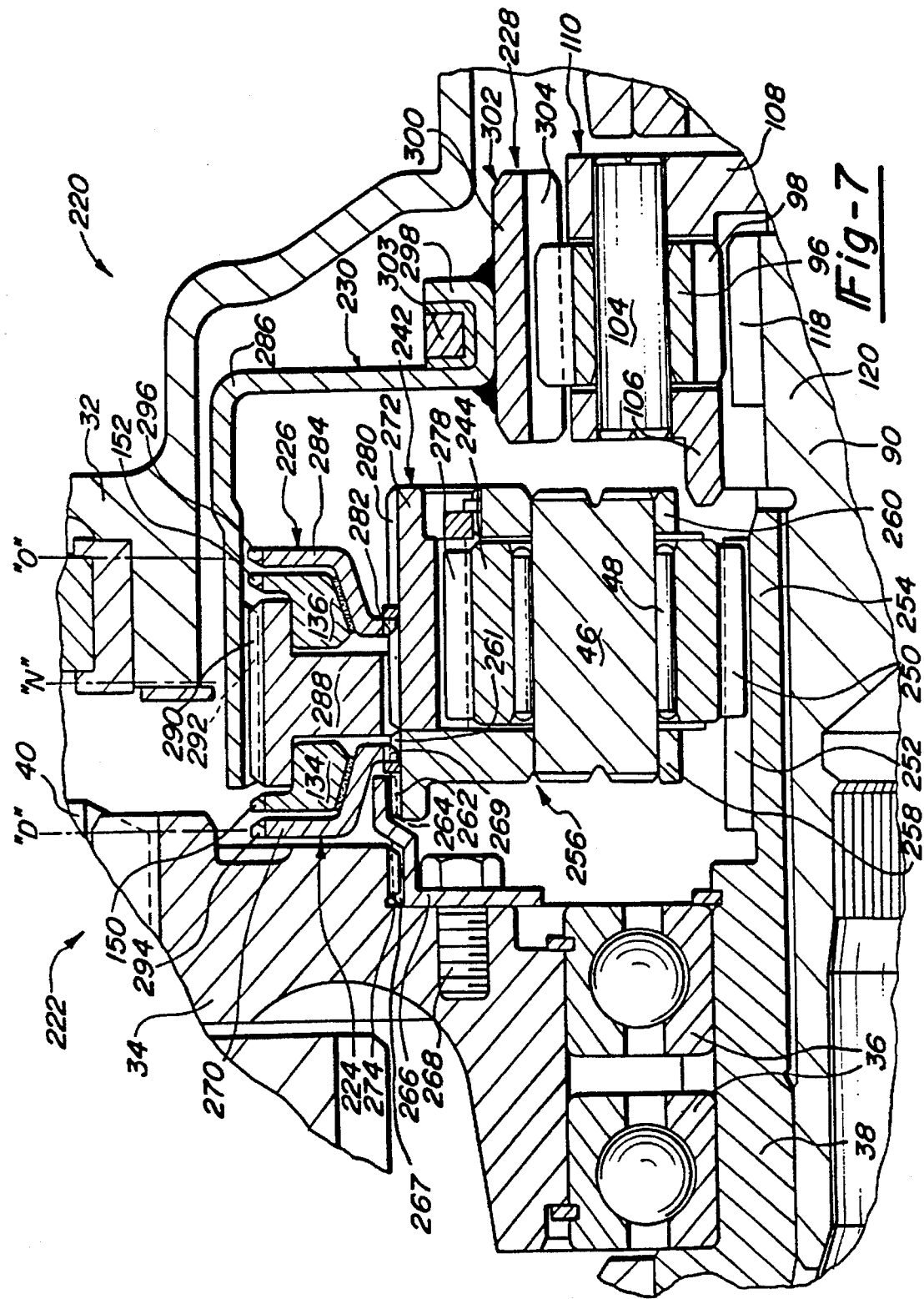
FIG. 7 is an enlarged fragmentary sectional view of the two-speed differential shown in FIG. 6.

With reference now to FIGS. 6 and 7, an alternative preferred embodiment of a two-speed differential 220 is shown. In general, two-speed differential 220 is a modified version of two-speed differential 20 which provides a more compact packaging arrangement of the various components. In view of the similarity between many of the various components, like numbers are used to identify those components of two-speed differential 220 that are similar in structure and/or function to components previously described with reference to two-speed differential 20.

In its most basic form, two-speed differential 220 includes an input mechanism 222 for receiving power from the vehicle's powertrain, a first drive mechanism 224 for establishing a first drive speed ratio, a second drive mechanism 226 for establishing a second drive ratio, an output mechanism 228 for delivering the drive torque to axle shafts 92 and 94, and a speed selecting mechanism 230 for coupling output mechanism 228 to one of first drive mechanism 224 and second drive mechanism 226. Input mechanism 222 is shown to include drive gear 34 that is supported via a pair of bearing assemblies 36 for rotation relative to stationary stator 38 and which is driven by output member 40. As before, first drive mechanism 224 is associated with a first rotary output of a first planetary gearset 242 while second drive mechanism 226 is associated with a second rotary output thereof. Planetary gearset 242 includes three pinion gears 244 each journalled on a pinion shaft 46 with a suitable roller bearing assembly 48 positioned therebetween. Each pinion gear 244 has seventeen teeth, identified by reference numeral 250, formed on its outer peripheral surface. Teeth 250 of pinion gears 244 are enmeshed with teeth 252 of a twenty-eight tooth sun gear 254 formed on stator 38. The first rotary output of planetary gearset 242 includes a carrier assembly 256 having a first carrier ring 258 and a second carrier ring 260 between which pinion shafts 46 are retained.

As seen, external splines 262 on first carrier ring 258 are enmeshed with internal splines 264 formed on an annular drive plate 266 which is fixedly secured to drive gear 34 via engagement of splines 267 and 274 in addition to threaded bolts 268. As such, carrier assembly 256 is coupled for common rotation with drive gear 34 and output member 40. In addition, a first clutch member 270 is coupled to first carrier ring 258 via engagement of splines 261 and 268. Thus, first clutch member 270 is rotatably driven by drive gear 34 for establishing a "direct drive" speed ratio between input mechanism 222 and first drive mechanism 224.

Second drive mechanism 226 is associated with a second rotary output of first planetary gearset 242 and includes a ring gear 272. Ring gear 272 has sixty-two teeth, identified by reference numeral 278, formed on its inner peripheral surface and which are enmeshed with teeth 250 of pinion gears 244. In addition, external splines 280 are formed on the outer periphery of ring gear 272 which mesh with a internal splines 282 formed on a second clutch member 284. Thus, driven rotation of pinion gears 244 about stationary sun gear 254 causes concurrent rotation of ring gear 272 about stator 38. However, since ring gear 272 rotates faster than carrier assembly 256 relative to stator 38, an "overdrive" speed ratio of 0.688 is established between input mechanism 222 and second drive mechanism 226.

Speed selecting mechanism 230 includes bi-directional cone-type synchronizer 130 and actuator 132 for causing selective axial movement of a bell-shaped shift sleeve 286 relative to first and second clutch members 270 and 284, respectively. As seen, bi-directional synchronizer 130 includes a clutch hub 288 journally surrounding the outer periphery of ring gear 272 and includes external splines 290 formed on its outer peripheral surface that are meshed with clutch teeth 292 formed on an inner peripheral surface of shift sleeve 286. Accordingly, shift sleeve 286 is axially slidable for selectively engaging its clutch teeth 292 with either of clutch teeth 294 on first clutch member 270 or clutch teeth 296 formed on second clutch member 284. In particular, shift sleeve 286 is movable to either a direct drive ("D") position coupling output mechanism 228 to first drive mechanism 224, a neutral position ("N"), or an overdrive ("O") position coupling output mechanism 228 to second drive mechanism 226.

A lower annular lipped segment 298 of shift sleeve 286 is fixed (i.e., welded) to the outer peripheral surface of a ring gear 300 associated with a second planetary gearset 302 of output mechanism 228. In fact, second planetary gearset 302 is substantially identical to second planetary gearset 88 of the first embodiment but for the fact that ring gear 300 is not an integral extension of shift sleeve 286. Additionally, two or more thickened pad 303 formed on shift fork 163 are retained within lipped segment 298 of shift sleeve 286. Thus, axial movement of shift fork assembly 157 results in concurrent axial movement of shift sleeve 286. As before, shift sleeve 286 is located in the direct drive position when the 1st through 5th Forward and Reverse drive ratios of the multi-speed transmission gearbox are selected, but is automatically shifted to the overdrive position for establishing the "overdrive" speed ratio when a 6th Forward drive ratio is selected. Such movement again is controlled due to actuation of electric motor 154 in response to the input signal supplied to control unit 172 by gear selector switch 170. Accordingly, rotational drive power is transmitted to output mechanism 228 through shift sleeve 286 with second planetary gearset 302 providing a differential torque split of 50/50 between left and right axle shafts 92 and 94, respectively.

Figure 8:
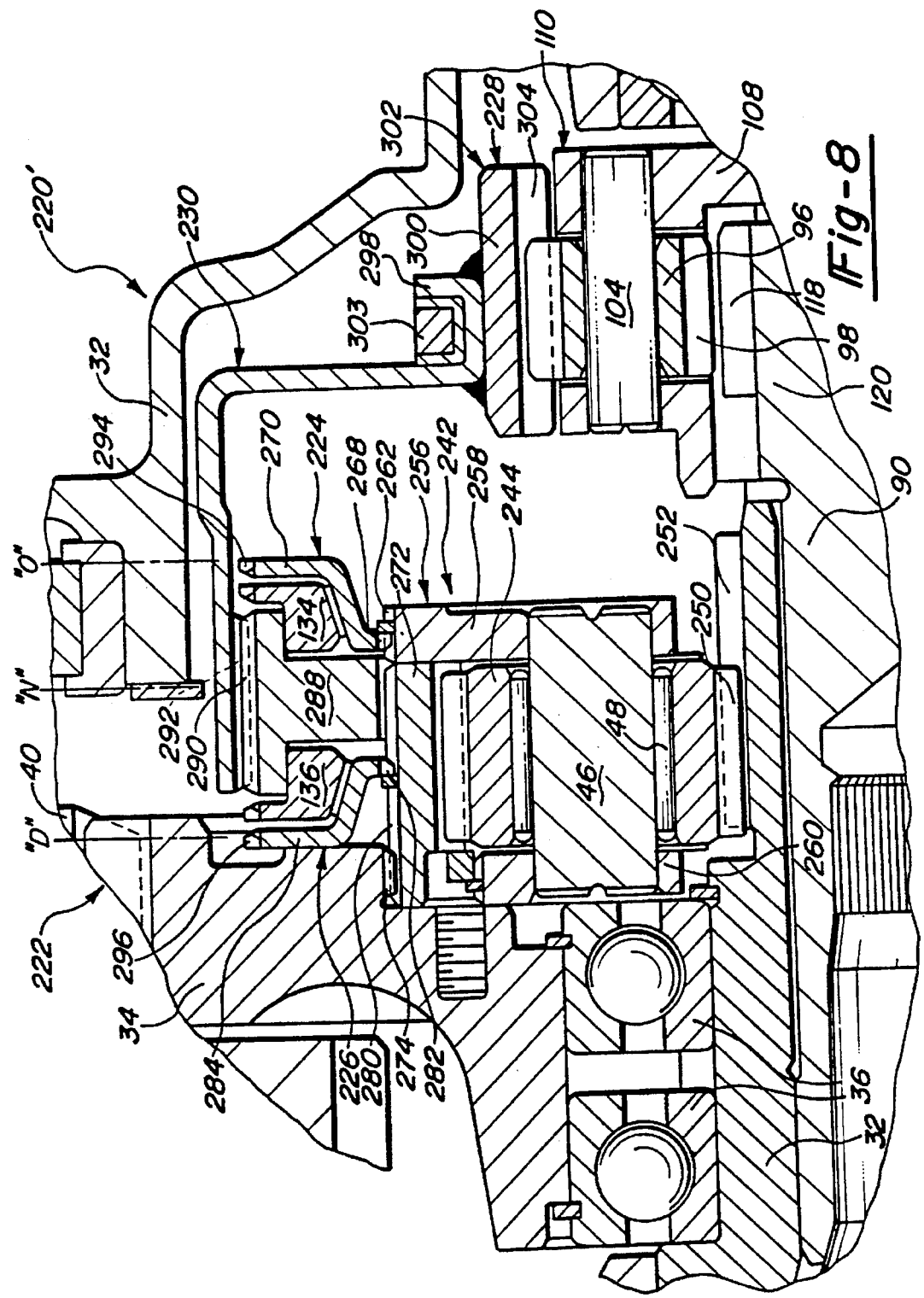
FIG. 8 is an enlarged fragmentary sectional view of a modified version of the two-speed differential shown in FIGS. 6 and 7 that is capable of providing an "underdrive" speed ratio in addition to a "direct drive" speed ratio.

With particular reference now to FIG. 8, a portion of a two-speed differential 220' is shown which is a modified version of two-speed differential 220 shown in FIGS. 6 and 7. Basically, the orientation of first planetary gearset 242 has been interchangeably reversed so as to now establish a "direct drive" speed ratio and an "underdrive" speed ratio. In view of such a reversed orientation of planetary gearset 242, first drive mechanism 224 (i.e., carrier assembly 256 and first clutch member 270) is now arranged so as to establish a 1.454 "underdrive" speed ratio relative to input mechanism 222 while second drive mechanism 226 (i.e., ring gear 272 and second clutch member 284) is arranged to establish a "direct drive" speed ratio relative to input mechanism 222. In general, ring gear 272 is now coupled for common rotation with input mechanism 222 so as to establish the "direct drive" speed ratio while the rotational speed of carrier assembly 254 establishes the "underdrive" speed ratio.

Continued reference to FIG. 8 shows that drive plate 266 has been removed and external splines 280 on ring gear 272 are now meshed with internal splines 274 formed on drive gear 34, whereby ring gear 272 is directly driven by drive gear 34. In a manner similar to that previously discussed, shift sleeve 286 is normally maintained in its direct drive position ("D") for coupling shift sleeve 286 to clutch member 284 for establishing the "direct drive" speed ratio between drive gear 34 and ring gear 300 of output mechanism 228 when the multi-speed gearbox is operated in its conventional 1st through 5th Forward and Reverse gears. However, upon selection of the 6th Forward gear, speed selecting mechanism 230 is automatically controlled for actuating motor 154 to move shift sleeve 286 to its underdrive position ("U") whereat it is coupled to clutch member 270 for driven rotation with carrier assembly 256. Since carrier assembly 256 rotates slower relative to stator 38 than directly driven ring gear 272, the 1.454 "underdrive" speed ratio is established for the 6th Forward gear. As is clear, the 1.454 "underdrive" ratio is merely the inverse of the 0.769 "overdrive" speed ratio provided by two-speed differential 220. Thus, a unique feature of the present invention involves the provision for selectively interchanging the planetary arrangement to establish at least one of an overdrive or an underdrive speed ratio in addition to a direct drive speed ratio. Finally, it will be appreciated by those skilled in differential design that the particular structure shown may be easily modified to combine separate components and the like to promote the interchangeability feature provided by this invention.

According to yet another alternate preferred embodiment of a two-speed differential 320, as illustrated in FIG. 9, a non-planetary intra-axle speed differentiating device is used for output mechanism 322. As is readily apparent, the other major components of two-speed differential 320, namely, input mechanism 222, first drive mechanism 224, second drive mechanism 226 and speed selecting mechanism 230 are arranged in a substantially identical orientation to that shown and disclosed in reference to two-speed differential 220' of FIG. 8. Thus, like numbers are again used to identify similar components with the following disclosure being directed primarily to detailing the structure and operative association of output mechanism 322 with such components of two-speed differential 320.

Referring still to FIG. 9, output mechanism 322 is shown as a differential gear mechanism 324 having a differential casing 326 supported for rotation within housing 32. Differential casing 326 has an enlarged interior chamber 328 and a pair of polar apertures 330 in communication therewith. An elongated cross-shaft 332 extends through interior chamber 328 and has its opposite ends disposed within polar apertures 330. In addition, a pinion gear 334 is rotatably supported on each end of cross-shaft 332 within interior chamber 328. Moreover, a pair of side gears 336 are also retained within interior chamber 328 and are each arranged in meshed engagement with pinion gears 334. In addition, differential casing 326 is open at its opposite axial ends for receipt of a pair of rotary outputs which, in turn, are drivingly coupled to the front wheels. More particularly, right axle shaft 94 is journally supported within a first open end 338 of differential casing 326 while a distal end of stationary stator 38 is journally supported within a second open end 340 of differential casing 326. As seen, axial shaft 94 if fixed (i.e., splined) with a respective one of side gears 336 for rotation therewith about an axis of rotation. Likewise, one end of an intermediate shaft 342 is shown fixed (i.e., splined) with the other of side gears 336 for rotation about the axis of rotation with axle shaft 92 fixed (i.e., splined) to intermediate shaft 342 for common rotation therewith. Lip segment 298 of shift sleeve 286 is shown to include internal splines 344 meshed with external splines 346 on differential casing 326. As such, shift sleeve 286 can be slid axially relative to differential casing 326 between its respective direct drive and underdrive positions while still being driven coupled to differential casing 326. Accordingly, rotational power (i.e., drive torque) is transmitted to output mechanism 322 through shift sleeve 286 with differential gear mechanism 324 preferably providing a torque split of 50/50 between left and right axial shafts 92 and 94, respectively, while permitting speed differentiation therebetween. It will be appreciated that non-planetary intra-axle differential gear mechanism 324 shown in FIG. 9 could be adapted for use with each of the two-speed differential shown in FIGS. 1 through 8.

While various embodiments of a two-speed differential have been disclosed, it will be appreciated that modifications may be made without departing from the present invention. For example, the gear driven input mechanism disclosed herein may consist of additional gears, a chain and sprocket assembly, a driveshaft, or a belt and pulley system. Also, additional drive speed ratios beyond those disclosed may be provided within a two-speed differential. Additional geared or non-geared couplings and speed selector mechanisms may further be employed to transmit power from the selected drive mechanism to the output mechanism. Thus, it is intended by the following claims to cover these and any other departures from the disclosed embodiments which fall within the true spirit of this invention.

What is claimed is:

1. A two-speed differential for use in a motor vehicle driveline for transferring power from a powertrain to a pair of output shafts, the two-speed differential comprising:
   an input mechanism for receiving power from the powertrain;
   a first planetary gearset including a first drive mechanism and a second drive mechanism, said first drive mechanism driven by said input mechanism for establishing a direct drive speed ratio, said second drive mechanism driven by said first drive mechanism for establishing a non-direct drive speed ratio;
   an output mechanism coupled to the pair of output shafts, said output mechanism including a second planetary gearset, said second planetary gearset having a ring gear, a carrier coupled for rotation with one of the output shafts, and a sun gear coupled for rotation with the other output shaft, said carrier supports a plurality of pinion gears enmeshed with said sun gear and said ring gears for relative rotation thereto; and
   a selecting mechanism including a shift sleeve coupled for driven rotation with said ring gear of said second planetary gearset, said shift sleeve movable between a first position for selectively coupling said first drive mechanism of said first planetary gearset to said ring gear of said second planetary gearset and a second position for selectively coupling said second drive mechanism of said first planetary gearset to said ring gear of said second planetary gearset, said selecting mechanism further including means for moving the shift sleeve between said first and second positions.

2. The two-speed differential of claim 1, wherein said first planetary gearset includes a stationary sun gear, a ring gear, and a carrier supporting a plurality of pinion gears enmeshed with said sun gear and said ring gear, said carrier being fixed for common rotation with said input mechanism for establishing said direct drive speed ratio, and said ring gear being driven by said carrier at an increased rotational speed relative thereto for establishing an overdrive speed ratio with respect to said input mechanism.

3. The two-speed differential of claim 1, wherein said first planetary gearset includes a stationary sun gear, a ring gear, and a carrier supporting a plurality of pinion gears enmeshed with said sun gear and said ring gear, said ring gear being fixed for common rotation with said input mechanism for establishing said direct drive speed ratio, and said carrier being driven by said ring gear at an increased rotational speed relative thereto for establishing an underdrive speed ratio with respect to said input mechanism.

4. The two-speed differential of claim 1, wherein said selecting mechanism further includes a first synchronizer for causing speed synchronization between said first output member of said first planetary gearset and said shift sleeve in response to movement of said shift sleeve toward said first position, and a second synchronizer for causing speed synchronization between said second output member of said first planetary gearset and said shift sleeve in response to movement of said shift sleeve toward said second position.

5. A two-speed differential for use in a motor vehicle driveline for transferring power from a powertrain to a pair of output shafts, the two-speed differential comprising:
   an input mechanism for receiving power from the powertrain;
   a first planetary gearset including a first drive mechanism and a second drive mechanism, said first drive mechanism, driven by said input mechanism for establishing a direct drive speed ratio, said second drive mechanism driven by said first drive mechanism for establishing a non-direct drive speed ratio;
   an output mechanism coupled to the pair of output shafts, said output mechanism including a second planetary gearset, said second planetary gearset having a ring gear, a carrier coupled for rotation with one of the output shafts, and a sun gear coupled for rotation with the other output shaft, said carrier supports a plurality of pinion gears enmeshed with said sun gear and said ring gears for relative rotation thereto; and
   a selecting mechanism including a shift sleeve coupled for driven rotation with said ring gear of said second planetary gearset, said shift sleeve movable between a first position for selectively coupling said first drive mechanism of said first planetary gearset to said ring gear of said second planetary gearset and a second position for selectively coupling said second drive mechanism of said first planetary gearset to said ring gear of said second planetary gearset, said selecting mechanism further including means for moving the shift sleeve between said first and second positions;

wherein said first drive ratio is a direct drive ratio and said second drive ratio is an overdrive ratio when said first drive mechanism is fixed for common rotation with said input mechanism, and further wherein said first drive ratio is an underdrive ratio and said second drive ratio is a direct drive ratio when said second drive mechanism is fixed for common rotation with said input mechanism.

6. The two-speed differential of claim 5, wherein said first planetary gearset includes a stationary sun gear, a ring gear, and a carrier supporting a plurality of pinion gears enmeshed with said sun gear and said ring gear, said carrier being fixed for common rotation with said input mechanism for establishing said direct drive speed ratio, and said ring gear being driven by said carrier at an increased rotational speed relative thereto for establishing said overdrive speed ratio with respect to said input mechanism.

7. The two-speed differential of claim 5, wherein said first planetary gearset includes a stationary sun gear, a ring gear, and a carrier supporting a plurality of pinion gears enmeshed with said sun gear and said ring gear, said ring gear being fixed for common rotation with said input mechanism for establishing said direct drive speed ratio, and said carrier being driven by said ring gear at an increased rotational speed relative thereto for establishing said underdrive speed ratio with respect to said input mechanism.

8. The two-speed differential of claim 5, wherein said selecting mechanism further includes a first synchronizer for causing speed synchronization between said first output member of said first planetary gearset and said shift sleeve in response to movement of said shift sleeve toward said first position, and a second synchronizer for causing speed synchronization between said second output member of said first planetary gearset and said shift sleeve in response to movement of said shift sleeve toward said second position.

9. A two-speed differential for use in a motor vehicle driveline for transferring power from a powertrain to a pair of output shafts, the two-speed differential comprising:

an input mechanism for receiving power from the powertrain;

a first planetary gearset including a first drive mechanism and a second drive mechanism, said first drive mechanism driven by said input mechanism for establishing a direct drive speed ratio, said second drive mechanism driven by said first drive mechanism for establishing a non-direct drive speed ratio, said first planetary gearset being selectively mountable in the two-speed differential such that said non-direct drive speed ratio is one an underdrive speed ratio and an overdrive speed ratio;

an output mechanism coupled to the pair of output shafts, said output mechanism including a second planetary gearset, said second planetary gearset having a ring gear, a carrier coupled for rotation with one of the output shafts, and a sun gear coupled for rotation with the other output shaft, said carrier supports a plurality of pinion gears enmeshed with said sun gear and said ring gears for relative rotation thereto; and a selecting mechanism including a shift sleeve coupled for driven rotation with said ring gear of said second planetary gearset, said shift sleeve movable between a first position for selectively coupling said first drive mechanism of said first planetary gearset to said ring gear of said second planetary gearset and a second position for selectively coupling said second drive mechanism of said first planetary gearset to said ring gear of said second planetary gearset, said selecting mechanism further including means for moving the shift sleeve between said first and second positions;

wherein said non-direct drive ratio is said overdrive ratio when said first drive mechanism is fixed for common rotation with said input mechanism, and further wherein said non-direct drive ratio is said underdrive ratio when said second drive mechanism is fixed for common rotation with said input mechanism.

10. The two-speed differential of claim 9, wherein said first planetary gearset includes a stationary sun gear, a ring gear, and a carrier supporting a plurality of pinion gears enmeshed with said sun gear and said ring gear, said carrier being fixed for common rotation with said input mechanism for establishing said direct drive speed ratio, and said ring gear being driven by said carrier at an increased rotational speed relative thereto for establishing said overdrive speed ratio with respect to said input mechanism.

11. The two-speed differential of claim 9, wherein said first planetary gearset includes a stationary sun gear, a ring gear, and a carrier supporting a plurality of pinion gears enmeshed with said sun gear and said ring gear, said ring gear being fixed for common rotation with said input mechanism for establishing said direct drive speed ratio, and said carrier being driven by said ring gear at an increased rotational speed relative thereto for establishing said underdrive speed ratio with respect to said input mechanism.

12. The two-speed differential of claim 9, wherein said selecting mechanism further includes a first synchronizer for causing speed synchronization between said first output member of said first planetary gearset and said shift sleeve in response to movement of said shift sleeve toward said first position, and a second synchronizer for causing speed synchronization between said second output member of said first planetary gearset and said shift sleeve in response to movement of said shift sleeve toward said second position.

* * * * *

UNITED STATES PATENT AND TRADEMARK OFFICE
CERTIFICATE OF CORRECTION

PATENT NO.   : 5,651,748
DATED         : JULY 29, 1997
INVENTOR(S) : ALLEN D. ADAM, BARRY L. FROST, JOHN R. FORSYTH

It is certified that error appears in the above-indentified patent and that said Letters Patent is hereby corrected as shown below:

Column 1, line 4, "08/227,501" should be --08/277,501--.

Column 2, line 34, "a" should be --an--.

Column 5, line 4, after "subsequent" insert --meshed engagement with clutch--.

Column 5, line 5, delete "on sect with clutch teeth 146".

Column 7, line 18, "a" should be --an--.

Column 9, line 15, "if" should be --is--.

Column 11, line 53, claim 9, after "one" insert --of--.

Signed and Sealed this

Seventh Day of July, 1998

Attest:

BRUCE LEHMAN

*Attesting Officer*  *Commissioner of Patents and Trademarks*